June 2, 1970  L. I. PICKERT  3,515,416

FLANGE TYPE SWIVEL FITTING

Filed Oct. 3, 1968  2 Sheets-Sheet 1

INVENTOR
LYNN I. PICKERT

BY  Dodge and Sons
ATTORNEYS

United States Patent Office

3,515,416
Patented June 2, 1970

---

3,515,416
FLANGE TYPE SWIVEL FITTING
Lynn I. Pickert, Watertown, N.Y., assignor to General Signal Corporation, a corporation of New York
Filed Oct. 3, 1968, Ser. No. 764,752
Int. Cl. F16l *23/00*
U.S. Cl. 285—413
2 Claims

ABSTRACT OF THE DISCLOSURE

A flange type swivel fitting characterized by a flange member composed of identical mating halves which are secured together by the assembly bolts used to attach the fitting to a mating fitting or to a body pad. The two halves define one boundary of the gasket-receiving space of the fitting, and the volume of this space is kept within tolerable limits by interfitting lugs and recesses which maintain the two halves in proper alignment.

BACKGROUND AND SUMMARY OF THE INVENTION

The flange type swivel fitting is used frequently today in brake pipe lines of railroad cars to provide unions between pipe sections or to attach pipes to body pads. The fitting comprises a shouldered swivel which is welded to the end of the pipe, a one-piece flange member which encircles the swivel and which is adapted to be bolted to the mating part, and an elastomer ring or gasket which is seated in an annular recess defined by portions of the swivel and the flange member and which is compressed against the mating part to form a seal when the assembly bolts are tightened. The swivel is welded to the pipe prior to its installation on the car, and the flange member must be placed on the pipe before the weld is made. Because of this, any structural member of the car through which the pipe passes must have an opening large enough to accommodate the flange member. Obviously this is undesirable. Moreover, if the flange member should be cracked or otherwise damaged during installation, as a result, for example, of improper alignment of the pipe, the entire pipe section must be replaced because removal of the damaged flange member requires that the swivel be sawed off, and this, of course, makes the original pipe section too short for its intended use.

The object of the present invention is to provide a practical split flange member which can be applied to and removed from the pipe while the latter is in place on the car. The improved flange member is characterized by a pair of mating units which are identical and are held together in assembled relationship by the usual assembly bolts or cap screws. The two halves of the flange member, in combination with the swivel, define the annular gasket-receiving recess of the fitting, and, since the volume of this recess must be closely controlled in order to insure that the gasket will be compressed sufficiently to provide an effective seal, it is essential that relative movement of the flange halves in a plane normal to the swivel axis be limited. The assembly bolts do not guarantee sufficiently precise alignment of the flange halves since, as in the conventional fitting, it is required that they fit rather loosely in the flange holes through which they extend. Therefore, the invention provides an auxiliary alignment mechanism. This mechanism takes the form of interfitting lugs and recesses. In addition to their primary function, these parts also tend to keep the flange halves in mated relation on the pipe prior to insertion of the assembly bolts. This frees the installer of the necessity for constantly holding the parts in place during the final assembly steps.

BRIEF DESCRIPTION OF THE DRAWINGS

The preferred embodiment of the invention is described herein with reference to the accompanying drawings in which.

DESCRIPTION OF THE PREFERRED EMBODIMENT

Figure 1:
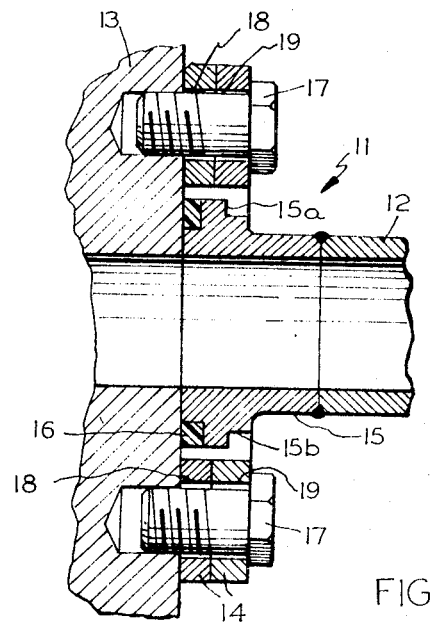
FIG. 1 is an axial sectional view through a body pad-pipe connection employing the improved fitting.
Figure 2:
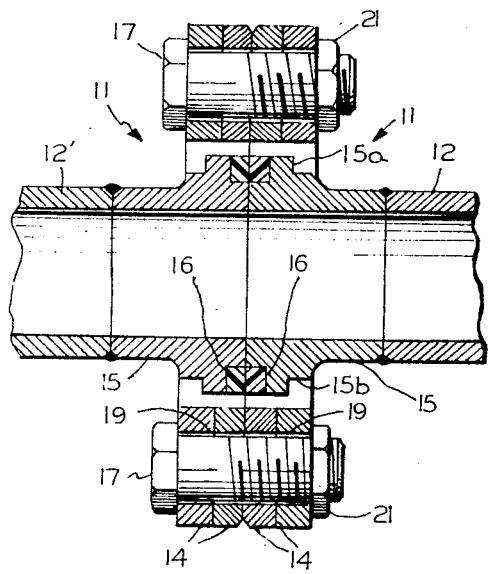
FIG. 2 is an axial sectional view through a pipe coupling or union employing a pair of the improved fittings.
Figures 3, 5:
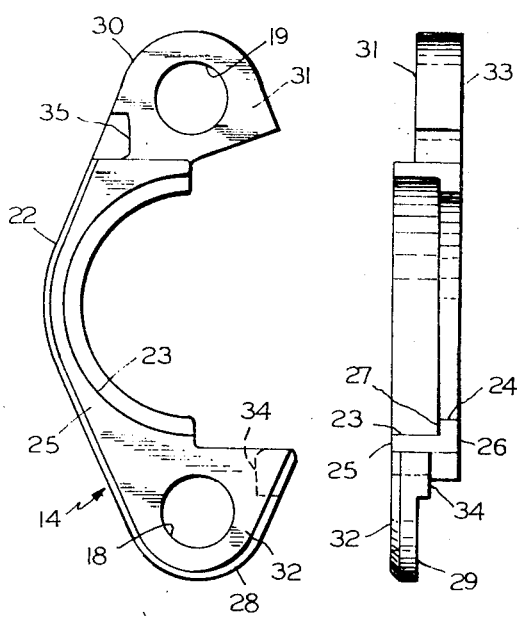
FIGS. 3 and 4 are plan views showing, respectively, the front and rear faces of the flange unit.
FIGS. 5 and 6 are elevation views of opposite sides of the flange unit.
Figures 4, 6:
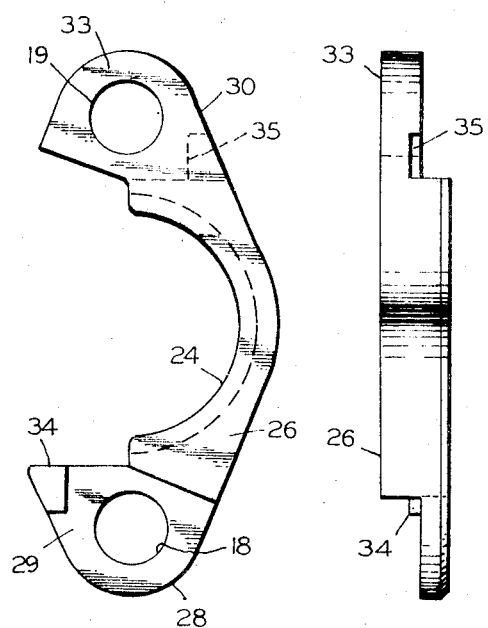

As shown in FIGS. 1 and 2, the improved fitting 11 may be used singly or in pairs to connect a pipe 12 to a body pad 13 or to couple two pipes 12 and 12'. The fitting comprises a flange member composed of two identical mating halves 14, a shouldered, tubular swivel 15 which is welded to the pipe and is engaged by the flange member, and a sealing gasket 16 which is seated in an annular recess defined by the swivel and the flange member and which is compressed against either the body pad 13 (see FIG. 1) or the corresponding gasket in the mated fitting (see FIG. 2). The fitting parts are held in assembled relationship, and the complete fitting is attached to the mating structure, by a pair of cap screws or bolts 17 which pass through aligned holes 18 and 19 in the flange halves 14 and are either screwed into the pad 13 or provided with nuts 21.

Figure 8:
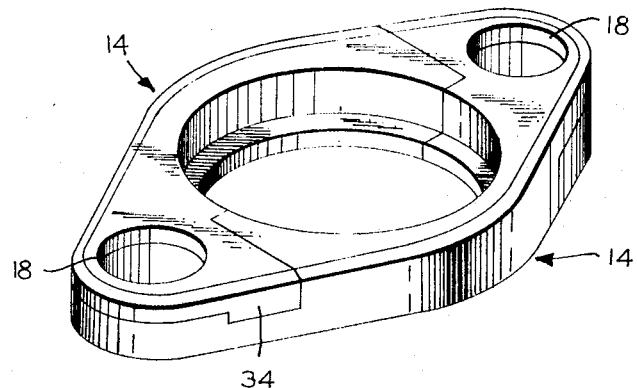
FIG. 8 is a perspective view of the two mated flange halves.

The fitting halves 14 are made of iron and are either cast or molded from powdered metal. Referring to FIGS. 3–6, each half 14 includes a center portion 22 provided with a pair of coaxial, semi-cylindrical surfaces 23 and 24 of different diameters which extend inwardly from the front and rear end faces 25 and 26, respectively, to a step 27. End face 25 is flat and lies in a plane normal to the axis of the semi-cylindrical surfaces 23 and 24 and, as a matter of convenience, rear end face 26 is made planar and parallel. When two havles are joined (see FIGS. 1, 2 and 8), the steps 27 cooperate to define an annular shoulder which is adapted to engage the shoulder 15a on swivel 15, the semi-cylindrical surfaces 23 form a circular cylindrical wall which serves as the outer periphery of the annular recess which receives gasket 16, and the surfaces 24 define a circular cylindrical wall which bears against the outer peripheral surface 15b on swivel 15.

Extending outward from opposite sides of center portion 22 are two flanges 28 and 30 having flat inner end faces 29 and 31, respectively, which are normal to the axis of surfaces 23 and 24 and each of which is adapted to abut the corresponding face on the opposite flange of the mating unit 11. The flanges 28 and 30 are pierced by the bolt holes 18 and 19, respectively. These holes are parallel with the axis of surfaces 23 and 24 and are so located that each will register with its opposite counterpart in a mating fitting half. The outer end faces 32 and 33 of flanges 28 and 30 are flush with the faces 25 and 26, respectively, of center portion 22. This arrangement is necessary in the case of faces 32 and 25, since they define the active or mating face of the fitting, but is merely preferable in the case of faces 33 and 26. However, if face 33 is not flat and normal to the axis of surfaces 23 and 24, bolt hole 19 must be surrounded by an annular surface which is flat and normal to the axis so that the head of cap screw 17 will seat properly on the fitting.

Since gasket 16 is intended to serve as a compression type seal, it should be evident that the volume of the annular recess in which it is seated must be rather closely controlled. This, of course, means that mating flange units 14 must be accurately aligned. The assembly bolts or cap screws 17 do not afford sufficiently precise alignment because, as customary in this art, there is considerable radial clearance between these fasteners and the holes 18 and 19 through the flange member. Therefore, each flange half is provided with an auxiliary alignment mechanism in the form of a lug 34 which projects from the inner face 29 of flange 28, and a conforming socket or recess 35 formed in the inner face 31 of flange 30; the design being such that the lug 34 and recess 35 of each flange unit 14 interfit with the recess and lug, respectively, of the mating flange unit. The alignment mechanism precludes relative separating movement of the flange halves in a plane normal to the axis of surfaces 23 and 24.

Figure 7:
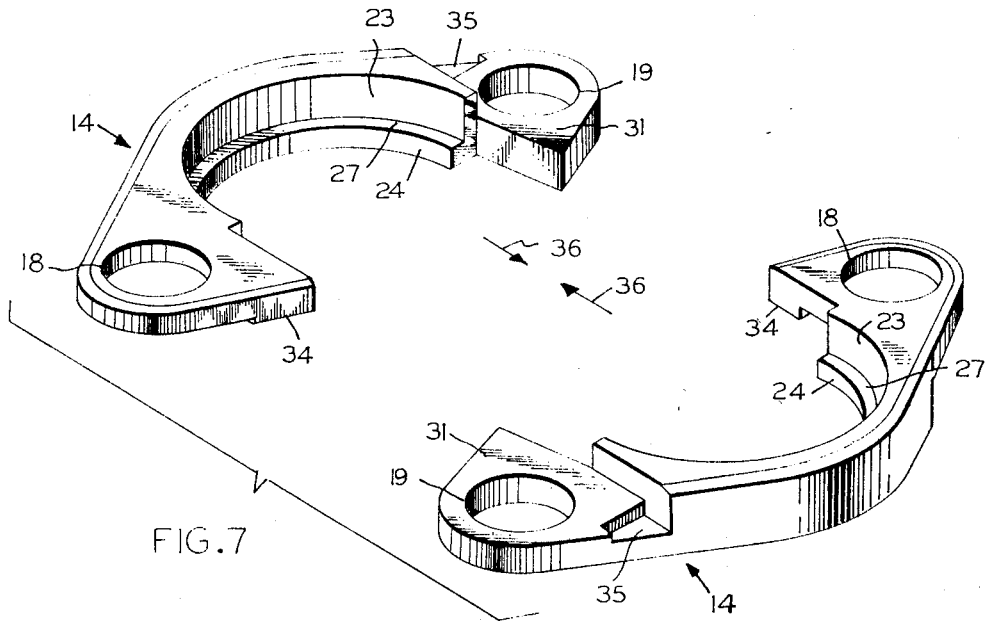
FIG. 7 is a perspective view showing two flange halves oriented for assembly.

In contrast to the conventional one-piece fitting, the improved fitting is assembled on a pipe 12 or 12' to which the swivel 15 already is welded, and which has been installed on the car. The two flange units 14 which are to be used in the fitting are placed at opposite sides of the pipe itself, inclined slightly relatively to each other out of a plane normal to the pipe axis, and then moved together into mating relation in the direction of the arrows 36 in FIG. 7. After the halves 14 have been joined, the assembly is slid along the pipe to a position wherein the annular shoulder defined by steps 27 engages swivel shoulder 15a. Gasket 16 is then inserted into the recess provided by surfaces 23 and swivel 15, and the fitting is finally bolted to a body pad 13 or another, previously assembled fitting. It should be noted that, while the alignment lugs 34 do not form a positive interlock between flange halves, they do tend to keep the halves in assembled relation, particularly after the halves have been moved into place on the swivel 15. This impositive self-retention characteristic frees the installer of the burden of constantly holding the parts together, and thus facilitates completion of the final assembly steps.

Removal of a defective unit 14 from an assembled fitting can be effected simply by withdrawing bolts or cap screws 17 and gasket 16, sliding the mating units 14 off swivel 15, and then cocking the units relatively to each other while pulling them apart.

What is claimed is:

1. A flange unit (14) adapted to mate with an identical unit to form the flange portion of a flange type swivel fitting, the flange unit comprising
   (a) a center portion (22) having end faces (25, 26) and a pair of coaxial, semi-cylindrical surfaces (23, 24) of different radii which extend inward from said end faces to a step (27), the surfaces and step serving to define a pair of circular cylinders and an annular shoulder, respectively, when two units (14) are mated,
   (b) the end face (25) from which the larger radius surface (23) extends being flat and lying in a plane normal to the axis of said surfaces;
   (c) a pair of flanges (28, 30) formed in one piece with and projecting from opposite sides of the center portion (22) and each containing a through bore (18 or 19) which is parallel with the axis of said surfaces, the bore (18 or 19) in each flange being located to register with the bore (19 or 18) in the opposite flange of a mating unit,
   (d) each flange having a first end face (29 or 31) which conforms to and abuts the first end face (31 or 29) of the other flange of a mating unit (14), and one of the flanges (28) having an opposite end face (32) which is flush with said end face (25) on the center portion (22), the first end faces (29, 31) of a unit (14) facing opposite ends of the unit; and
   (e) a lug (34) projecting from said first end face (29) of one flange (28) in the direction of said axis and a conforming recess (35) in said first end face (31) of the other flange (30), the lug and recess being adapted to fit the recess and lug, respectively, of a mating unit and prevent relative, separating movement of the mated units in a plane normal to said axis.

2. A fitting unit (14) as defined in claim 1 in which the first end faces (29 and 31) of the flanges (28 and 30) are flat and lie in a plane normal to the axis of the semi-cylindrical surfaces (23, 24).

References Cited

UNITED STATES PATENTS

| | | | |
|---|---|---|---|
| 571,220 | 11/1896 | Dresser | 285—413 |
| 674,928 | 5/1901 | Mauran | 285—368 X |
| 696,603 | 4/1902 | Smith | 285—413 |
| 1,179,091 | 4/1916 | Gray | 285—368 X |
| 1,309,146 | 7/1919 | Mann | 285—368 |
| 1,809,313 | 6/1931 | Root | 285—368 X |

THOMAS F. CALLAGHAN, Primary Examiner

U.S. Cl. X.R.

285—368